Aug. 12, 1958   R. H. WAITZMAN   2,846,805
FISHING LURE
Filed Aug. 3, 1956

INVENTOR.
RICHARD H. WAITZMAN
BY
Paul B. Fike
PATENT AGENT

2,846,805

FISHING LURE

Richard H. Waitzman, San Jose, Calif.

Application August 3, 1956, Serial No. 602,000

5 Claims. (Cl. 43—42.06)

The present invention relates to fishing lures and more particularly to lures for trolling or casting utilization.

Fishermen advance conflicting theories as to the success or failure experienced in catching fish with a particular lure. One will firmly hold that the lure attracts the fish because it constitutes a morsel of apparently edible character. Another will just as firmly state that the lure constitutes a threat and must therefore be attacked and destroyed by the fish. Regardless of the reason, it is empirically known that certain lures are decidedly preferable in their utilitarian part in the catching of fish. The term "part" is employed for it is additionally known that the action of the lure in the water, as usually controlled by the fisherman, is an equally important contribution to the ultimate success or failure of the fishing effort.

It is a general object of the present invention to provide an improved fishing lure designed so as to be particularly effective, as confirmed by actual experience, in its fish-attracting function.

A feature of the invention relates to the construction of the lure whereby a particular darting action thereof occurs automatically when a variable pull is experienced.

More particularly, it is a feature to provide a lure designed to vary from an equilibrium position in the water when a variance in the line tension is experienced.

A further feature relates to the design of the lure so that it partakes of periodic vagaries in its action dependent, as above indicated, to a large degree upon the line tension, but additionally, dependent upon other unpredictable factors such as, for example, the water current instantaneously prevailing.

Additionally, it is a feature to provide a fishing lure that is simple to fabricate, inexpensive, and not readily injured in use.

Figure 1:
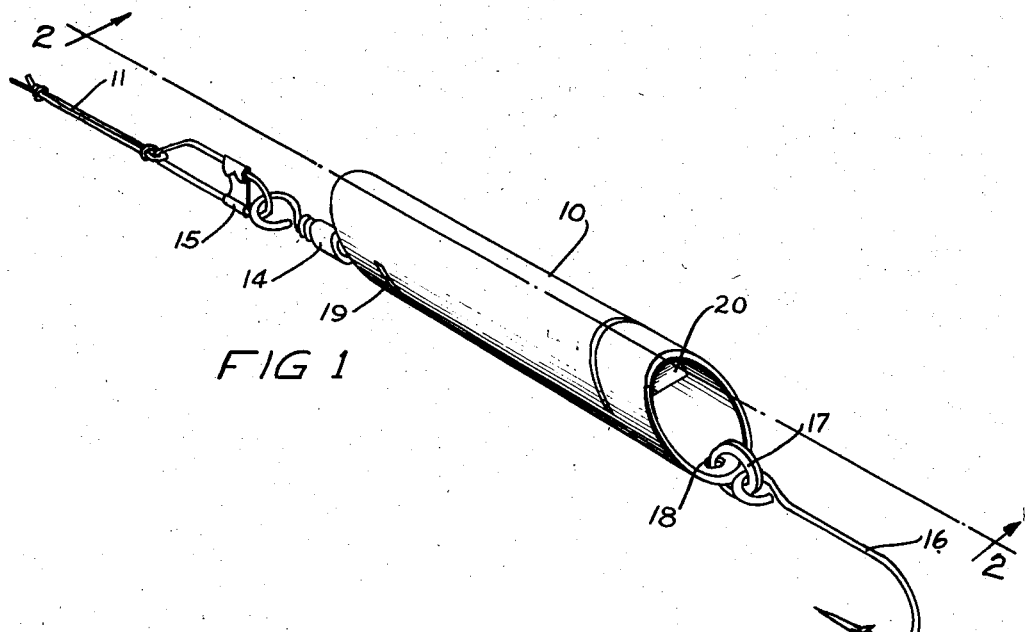
Figure 2:
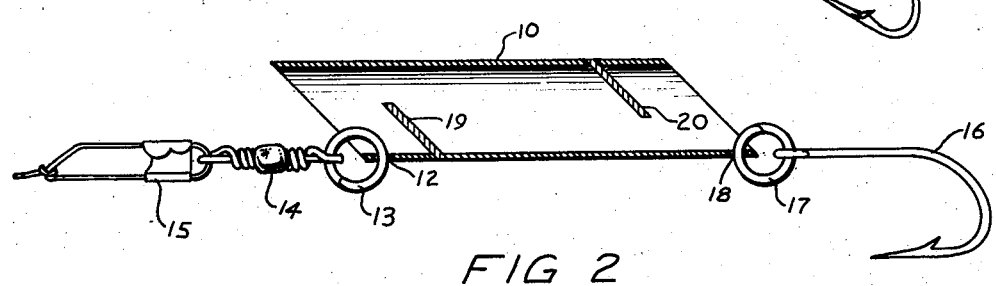
Figure 3:
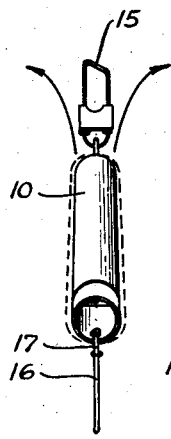

Other objects and features of the invention will become more apparent from the following description of the accompanying drawing wherein:

Fig. 1 is a perspective view of a fishing lure constituting a preferred embodiment of the invention, Fig. 2 is a substantially central sectional view taken along line 2—2 of Fig. 1, and illustrating the lure substantially in the position it naturally assumes in the water when being steadily pulled therethrough, and Fig. 3 is a view illustrative of the action of the lure in the water when the line tension is relaxed.

Generally, a lure embodying the present invention includes a relatively thin, elongated body to one end of which a fishing line may be attached so that when pull is exerted on the line, the lure body will assume a position in the water with its longitudinal axis substantially aligned with the direction of pull. In addition, means are either attached or formed integrally with the body to provide for a predetermined equilibrium disposition of the lure transversely to the direction of pull when the line tension is exerted, as above mentioned, but to permit a departure from such equilibrium distribution when the line tension is relaxed.

In the preferred embodiment shown in the drawings, the body 10 of the lure is formed by a thin, cylindrical tube that is cut diagonally parallel at its ends. In order to attach the body 10 to a fishing line, indicated at 11, a small hole 12 is formed adjacent one end of the body 10. More particularly, as can best be visualized by reference to Fig. 2, the hole 12 is formed in the wall of the cylindrical tube at a point diametrically opposite the forward projecting end thereof formed by the diagonal cut, as above described. A ring 13 passes through the hole 12 so as to make connection between the body 10 and a conventional swivel 14. The other end of the swivel is connected to a leader clip 15, which, in turn, is connected to the line 11. As is well known, such a leader clip is operated much in the fashion of an ordinary safety pin in the making of such connection with the line.

A fish hook 16 is connected to the remote end of the body 10 by a ring 17 that passes through a second hole 18. Such hole 18 is formed in the body 10 in substantial alignment with the hole 12, so that it lies adjacent the rearmost projecting end of the diagonally cut body 10.

As thus far described, it will be seen that since the body 10 is of generally cylindrical, tubular shape, and the line is connected to one end thereof; a pull on the line 11 will effect a general alignment of the axis of the tubular body 10 with the direction of pull, since this will be the disposition of least resistance of the body to its passage through the water. In order to restrict the flow of water through the tubular body 10 and achieve the desired action of the lure in the water, a pair of baffles 19 and 20 are secured within the tubular body. As shown, the baffle 19 is secured to the under portion of the body 10, as viewed in Fig. 2, a short distance from the hole 12; while the baffle 20 is connected to the upper portion of the body 10 at a point quite near the remote or hook end thereof. Both baffles 19 and 20 are secured in parallelism with the diagonally severed ends of the body 10 and restrict the flow of water to substantially one-half of the cross-sectional area of the tube.

The lure now having been fully described, its action in the water can be undertaken. If it is assumed that a trolling operation is to be carried out, the line 11, more commonly referred to as a leader, will be connected to a weight which will, in turn, be connected to the main fishing line attached to the pole held by the fisherman on the trolling boat. It will be understood that the weight will cause the main fishing line to be disposed at a relatively sharp inclination in the water, while the leader line will be disposed substantially horizontally, or at perhaps a slight inclination, as determined by the weight of the lure connected to its end. If it is assumed that a steady pull is exerted on the line 11 along substantially a horizontal line, the described lure will assume the disposition indicated in Fig. 2 with its longitudinal axis substantially aligned with the direction of pull. This disposition might conveniently be termed the "upright" disposition of the lure with the forward projecting end of the body 10 lying substantially above the line of pull and over the swivel 14. Such upright disposition results from the force of the water against the tubular body 10 and the baffles 19 and 20. If the steady pulling force exerted by the leader line 11 is removed as a result, for example, of the passage of the boat over a heavy swell, the force against the lure body 10 and the baffles 19 and 20 will be reduced and the body will tip transversely to the right or left, as indicated by phantom lines in Fig. 3. Such tipping having occured, the configuration of the body 10 and the baffles 19, 20 will urge its continued movement in such direction, as indicated by the arrows in Fig. 3. Furthermore, since no pull is being exerted by the line 11, the lure will tend, under the force of gravity, to move lower in the water. Ultimately then, the movement of the lure upon relaxation of line tension is one of a downward curve either to the right or left. Whether the movement will be to the right or to the left will be understood as determined by the instantaneous existing conditions in the water.

After the lure has dived in a darting fashion to the left or right, a renewed pull on the line will act, through the exertion of force against the tubular body 10 and the baffles 19, 20 to reestablish the upright position illustrated in Fig. 2, and such upright position will be maintained until further variance in line tension is experienced.

It will be understood that the darting action described above can also be obtained when fishing by casting. After the lure has been cast to a point at some distance from the fisherman, the fisherman may, by pulling in the line in a sporadic rather than steady manner, effect the darting action.

Various modifications and alterations can obviously be made without departing from the spirit of the invention; and the foregoing description of a preferred embodiment is to be considered as purely exemplary and not in a limiting sense. The scope of the invention is to be indicated by the appended claims.

What is claimed is:

1. A fishing lure comprising a generally tubular body, means for attaching a fishing line to one end of said body whereby when pull is exerted on the line, said body will assume a position in the water with the axis thereof generally aligned with the direction of pull, means including a baffle disposed within said body diagonally relative to its axis whereby the force of water against said baffle urges said tubular body into a predetermined disposition when pull is exerted on the fishing line, said line-attaching means being disposed at the lower perimetric edge of said tubular body when in said predetermined disposition.

2. A fishing lure according to claim 1 wherein said line-attaching means includes a swivel connecting the line to one end of said tubular body.

3. A fishing lure comprising a generally tubular body, means for attaching a fishing line to one end of said body whereby when pull is exerted on the line, said body will assume a position in the water with the axis thereof generally aligned with the direction of pull, a pair of baffles secured within said body in spaced parallel relation and connected to said tubular body at diametrically-opposite positions whereby the force of water against said baffles urges said tubular body into a predetermined rotative disposition relative to its longitudinal axis.

4. A fishing lure according to claim 3 wherein said tubular body is cut diagonally in parallelism to said baffles at both ends thereof.

5. A fishing lure comprising a generally tubular body, means for attaching a fishing line to one end of said body whereby when pull is exerted on the line, said body will assume a position in the water with the axis thereof generally aligned with the direction of pull, means including a baffle disposed within said body diagonally relative to its axis whereby the force of water against said baffle urges said tubular body into a predetermined disposition when pull is exerted on the fishing line, said tubular body being cut diagonally in parallelism to said baffle at both ends.

References Cited in the file of this patent

UNITED STATES PATENTS

| | | |
|---|---|---|
| 1,710,908 | Vereecken | Apr. 30, 1929 |
| 2,229,239 | Davis | Jan. 21, 1941 |
| 2,494,093 | Hill | Jan. 10, 1950 |